July 15, 1958     L. E. ALLEN     2,842,925
SELF-PROPELLED COMBINE

Filed Sept. 1, 1955     2 Sheets-Sheet 1

Inventor
Lawrence E. Allen
by
Attorney

July 15, 1958 L. E. ALLEN 2,842,925
SELF-PROPELLED COMBINE

Filed Sept. 1, 1955 2 Sheets-Sheet 2

Inventor
Lawrence E. Allen
Attorney

United States Patent Office 2,842,925
Patented July 15, 1958

2,842,925

SELF-PROPELLED COMBINE

Lawrence E. Allen, Independence, Mo., assignor to Allis-Chalmers Manufacturing Company, Milwaukee, Wis.

Application September 1, 1955, Serial No. 532,052

3 Claims. (Cl. 56—21)

This invention relates to harvesting machines, and it is concerned more particularly with the regulation of the cutting height and of the ground speed of a self-propelled combine harvester.

Self-propelled combine harvesters are usually large, fairly complex machines performing a great many functions in the handling of crops; and the mechanisms of the harvester must be often and quickly adjusted to meet crop conditions or conditions of the terrain. Two of the mechanisms of the harvester which often require adjustment are the height of the sickle bar relative to the ground and the ground speed of the harvester. At times it is even desirable to adjust the ground speed and the sickle bar height simultaneously. This last mentioned condition might prove difficult with combines in the prior art because the operator has only two hands and one hand must be kept on the steering wheel while the other hand is available for making other adjustments, such as the speed and height adjustments.

Generally, it is an object of the invention to provide an improved self-propelled harvester incorporating mechanisms for adjusting the cutting height and the ground speed of the machine, and a control device for these mechanisms which can be actuated by means of a single lever or the like.

More specifically, it is an object of this invention to provide an improved self-propelled harvester of the hereinabove outlined character having a control member positioned at an operator's platform and which may be conveniently manipulated to control the ground speed of the harvester and the height of the sickle bar carried by the harvester.

It is a further object of this invention to provide an improved combine harvester of the above outlined character wherein the ground speed of the harvester can be controlled by pivoting a rotatably and reciprocably mounted lever, and wherein the height of said header relative to ground can be increased or decreased by raising or lowering, respectively, of said lever.

A further object of this invention is to provide a safety latch which is positionable relative to the mentioned rotatable and reciprocable lever whereby the lever is normally prevented from descending to a header lowering position.

These and other objects and advantages of the invention will become apparent from the description herein and from the accompanying drawings in which.

Figure 1:
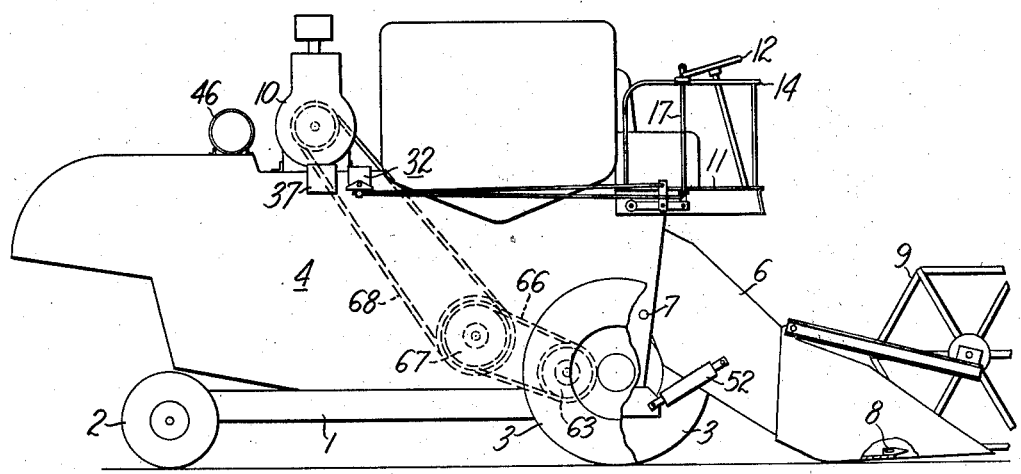
Fig. 1 is a schematic side elevation of a self-propelled combine harvester embodying the invention with parts broken away and parts shown in section.

Referring to the drawings and particularly Fig. 1, it is seen that the invention has been embodied in a self-propelled combine harvester including a frame structure 1 mounted on axle members carried by dirigible wheels 2 and traction wheels 3. The combine harvester is provided with customary harvesting mechanism including a body 4 enclosing separating mechanism (not shown). A combined thresher and header unit 6 of conventional construction is pivotally mounted on body 4 for up and down swinging motion relative thereto about a transverse pivot axis indicated at 7. A conventional cutter or sickle bar mechanism 8 is mounted on the forward end of the header 6. The header is provided with a reel structure 9 positioned in overlying relation to the sickle mechanism for moving cut grain to a rearward point of delivery. The header is also provided with other mechanism (not shown) for moving the cut grain from the reel structure to a conventional threshing mechanism not shown.

All of the previously mentioned harvesting mechanisms are driven by an engine 10 through conventional means. Engine 10 is mounted on a rearward portion of frame 1. An operator's platform 11 is mounted on a forward portion of frame 1, and suitable linkages, only some of which are shown and will be explained hereinbelow, extend from the platform to the various mechanisms so that an operator on the platform is able to control the operations of the machine. For example, steering wheel 12 is operatively mounted on the platform for controlling dirigible wheels 2. For the purpose of operator safety the platform 11 is provided with an elevated surrounding rail 14.

The control means for the header height and the rate of ground travel of the combine will now be described. A bearing block 16 (Fig. 3) is attached to rail 14 at the right side of the platform 11. A control rod or master control member 17 is received in block 16 in a manner permitting vertical back and forth sliding in the direction of its principal axis A—A, and turning or pivoting about said axis relative to block 16 that is the master control member is adjustably mounted on the harvester for back and forth movement between header raising and lowering positions and for back and forth movement between speed increasing and decreasing positions as will be more fully described hereinbelow. At its upper end rod 17 is provided with a turned over portion forming a lever or control handle 18 (see Fig. 3).

The control member 17 is operatively interconnected to the header adjusting means 51, 52 and driving or propulsion means 61 by separate motion transmitting means which will now be described. The separate motion transmitting means comprises a first force transmitting means including lever 22, shaft 24, arm 25 and link 28, and a second force transmitting means including arm 19 and link 27.

Referring more particularly to the second actuating means, an arm formed by a piece of strap iron 19 is rigidly attached to a lower portion of control rod 17 and extends at right angles to the axis A—A of the rod. The other end of arm 19 is pivotally connected to link 27, which is in turn pivotally connected to the midportion of a valve actuating rocker 29. The pivotal connection between arm 19 and link 27 provides a flexible power transmitting connection for the first actuating means. It will be understood that the interconnecting means 19, 27 is responsive to rotary motion only of master control member 17.

Figure 3:
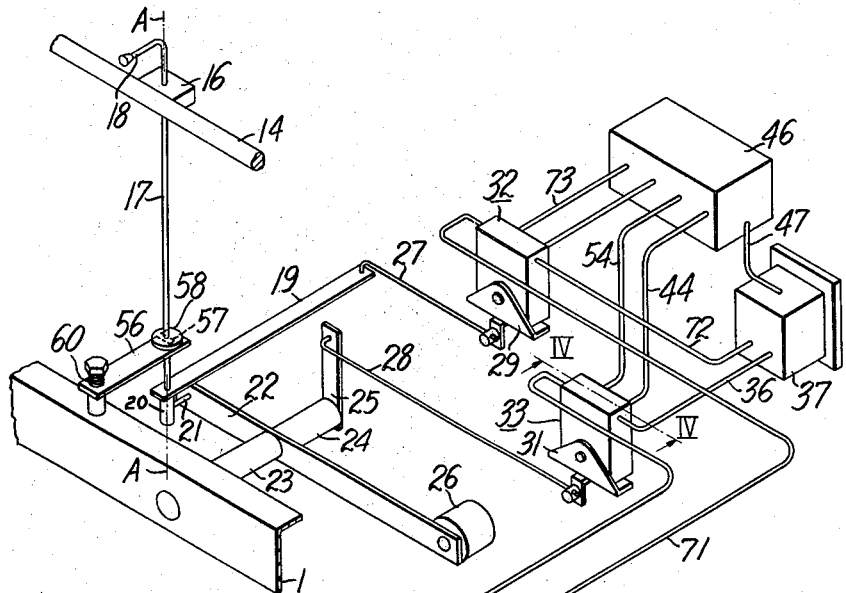
Fig. 3 is a diagrammatic perspective view of portions of the harvester shown in Fig. 1 and illustrating operative connections between a control lever and associated control apparatus.
Figure 3:
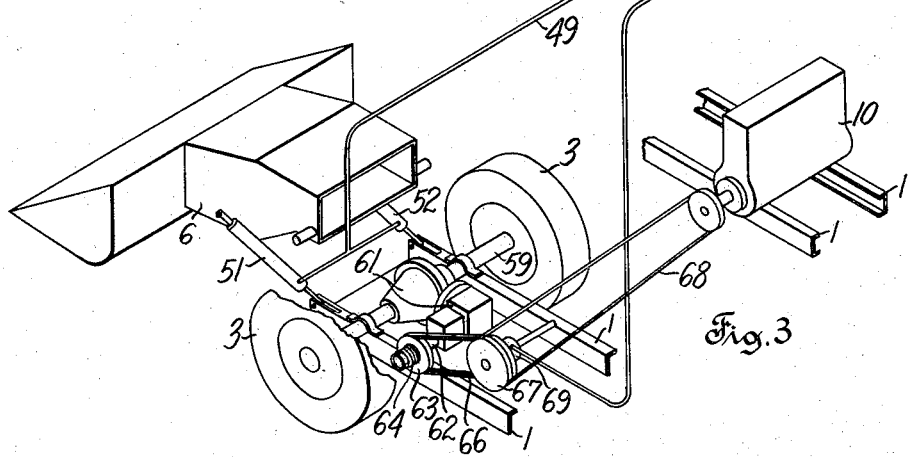

The first or other actuating means includes a socket member 20 which is rigidly attached to control rod 17 and which receives a ball (not shown) mounted on the end of a pin 21. The socket or thrust transmitting element 20 is provided with a horizontally extending arcuate slot (not shown) through which pin 21 projects. The pin 21 is rigidly connected at its free end to a lever 22. This arrangement provides a semiuniversal or pivotal mounting between the control member 17 and the other or second actuating means. Back and forth pivotal movement of rod 17 about axis A—A will not be transmitted to arm 22 as pin 21 will ride in the arcuate slot. However, this first interconnecting means is responsive to back and forth vertical movement of rod 17 as the pin 21 is prevented from moving vertically by its engagement with the top and bottom edges of the arcuate slot. The lever 22 is journaled at a midportion thereof on a bushing 23 carried by frame 1. Rigidly connected to the lever 22 for rotation therewith on the axis of bushing 23 is a shaft 24, and a radial arm 25 is rigidly secured to the free end of shaft 24. The other end of lever 22 is provided with a counterbalancing weight 26 whose function is to bias control member 17 toward the neutral position in which it is shown in Fig. 3. Arms 19 and 25 are pivotally connected to links 27 and 28, respectively, which are in turn pivotally connected to midportions of valve actuating rockers 29 and 31, respectively. It will be understood that the valve rocker 31 and valve 33 constitute separate control means which are operatively connected to header adjusting means 51, 52. The valve rocker 29, valve 32 and variable speed mechanism 67, 69 constitute separate control means operatively connected to propulsion means 61.

Valve actuating rockers 29 and 31 are pivotally mounted on the lower portions of valve housings 32 and 33, respectively which are rigidly attached to frame 1. The manner in which the valves in housing 32 operate is identical to the manner in which the valves in housing 33 function, so details concerning only one will be recited.

Figure 4:
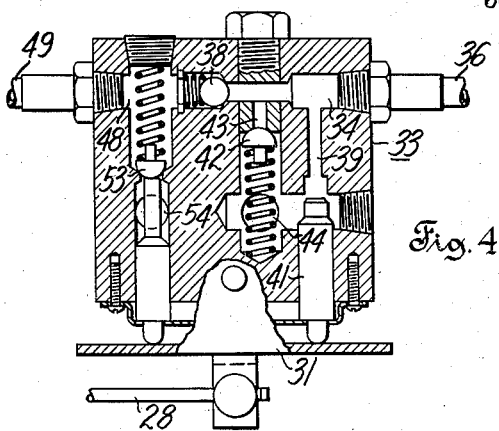
Fig. 4 is an enlarged section view of one of the valve mechanisms shown in Fig. 3, the view of Fig. 4 being taken on line IV—IV of Fig. 3.

Referring to Figs. 3 and 4 it is seen that housing 33 is provided with a pressure fluid inlet 34 connected by hollow tubing 36 to the output end of hydraulic pump 37. A spring loaded ball 38 is seated in blocking relation to inlet 34. A branch 39 of inlet 34 descends downwardly therefrom and at its lower portion is provided with a valve 41 which can be actuated to close branch 39. A spring loaded relief valve 42 is positioned normally blocking a relief passage 43 connected with inlet 34. As shown in Figs. 3 and 4 branch 39 is connected by tubing 44 to a fluid storage tank 46 which in turn is connected to the intake side of pump 37 by means of tubing 47.

Housing 33 is also provided with an outlet 48 connected by tubing 49 to hydraulic rams 51 and 52 which are pivotally connected at their barrel ends to frame 1 and are pivotally connected at their plunger ends to unit 6. Referring to Fig. 4, ball 38 is shown as blocking communication between outlet 48 and inlet 34. A spring loaded valve 53 normally blocks outlet 48 from communication with tubing 54 which is connected to oil tank 46.

The operation of raising or lowering the combined thresher and header unit 6 will now be described. If it is desired to raise unit 6, operating handle 18 is grasped by the operator and moved vertically upward to a header raising position. This movement does not affect the linkage for valve 32, but it does raise the connected end of lever 22 which results in a clockwise movement of arm 25 as viewed in Fig. 3. This clockwise movement of arm 25 moves link 28 so as to swing valve actuating rocker 31 anticlockwise about its connection with housing 33 resulting in the raising of valve 41 (Fig. 4) by rocker 31. Prior to this time, pump 37 which is driven from engine 10 by conventional means (not shown) has been pumping hydraulic fluid to inlet 34 and this fluid was passing around valve 41 and back to storage tank 46 through tubing 44. When valve 41 is seated by the action of rocker 31, blocking passage 39, the hydraulic fluid which acts against ball 38 causes the ball 38 to move to the left away from its seat. The hydraulic fluid then enters tube 49 and actuates rams 51 and 52 to raise header 6. Then, when header 6 is raised to its desired height control rod 17 is lowered to its neutral position as shown in Fig. 3. The hydraulic fluid delivered by pump 37 is now again bypassed through passage 39 around valve 41 and back to tank 46 through tube 44. The back pressure of the hydraulic fluid in tube 49 acts against ball 38 moving it to the right and seating same to block that end of passage 48. Valve 53 is already blocking the lower portion of passage 48 and, therefore, the hydraulic fluid is trapped in the rams 51 and 52 so as to retain header 6 in its desired raised position.

Figure 2:
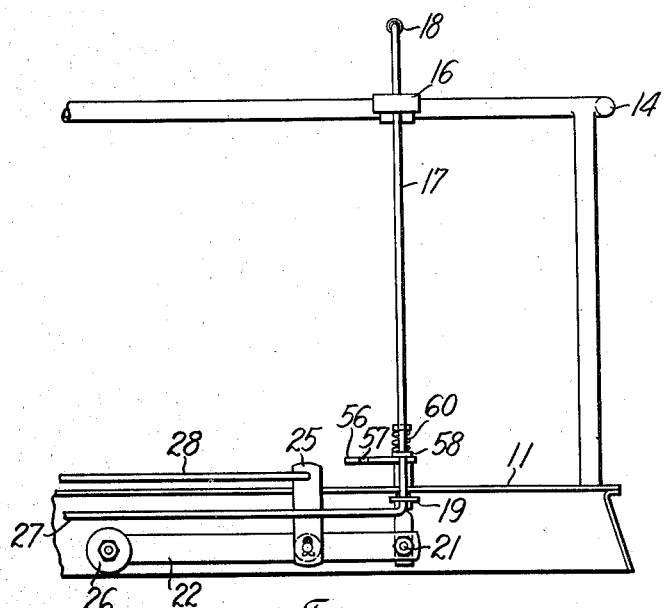
Fig. 2 is an enlarged view of a portion of the operator's platform and associated parts shown in Fig. 1 with some parts removed for the purpose of disclosure.

Now, if it is desired to lower header 6 all that has to be done is to push down on handle 18 vertically sliding control rod 17 downwardly relative to bearing block 16 to a header lowering position. This results in an anticlockwise movement of arm 25 and a movement of link 28 to the left which causes valve actuator 31 to pivot clockwise, raising valve 53 from its seat. Hydraulic fluid can now escape from rams 51 and 52 around valve 53 and out through tube 54 to storage tank 46. This process is continued until the desired lowering of header 6 is achieved. This lowering process can be performed irrespective of whether pump 37 is operating or not. Considering the possibility of danger resulting from this last mentioned fact, a safety device as shown in Figs. 2 and 3 is provided as follows: A latch plate 56 is mounted at one end on the framework 1 of the operator's platform 11 so that it can be pivoted horizontally. A notch 57 is provided in the latch plate 56 adjacent its other end. This notch is positionable to receive rod 17 but is of a size preventing an enlarged portion 58 of rod 17 to pass through the notch. So, when operating rod 17 is returned to its neutral position, latch 56 is pivoted until notch 57 is positioned around control rod 17 and in underlying relation to enlargement 58. From the foregoing, it is seen that the plate 56 and notch 57 constitute stop means to prevent accidental downward movement of control member 17 and a subsequent lowering of header 6. Latch 56 can be readily moved into and out of engagement with control rod 17 by the operator manipulating latch 56 with his foot. A coil spring 60 is provided to bear downwardly on latch plate 56 so as to frictionally retain it in any position of pivotal adjustment on frame 1.

Referring to Fig. 3, it is seen that traction wheels 3 are mounted in supporting and driven relation to axle 59 which is operatively connected to a differential and transmission 61 which is provided with a power input shaft 62. A variable pitch diameter pulley 63 of conventional construction is mounted on shaft 62 and is provided with a spring 64 biasing an axially shiftable pulley section toward an axially fixed complementary pulley section. A belt 66 provides a driving connection between pulley 63 and hydraulically operated adjustable pulley 67. Adjustable pulleys 63 and 67 with belt 66 form a conventional change or variable speed mechanism and the well known details thereof are not herein recited as they will be apparent to one skilled in the art. Pulley 67 is a compound pulley having a portion operatively driven by belt 68 connected to engine 10. A hydraulic cylinder 69 is operatively connected to a movable portion of pulley 67 for reducing the spacing between the sections of pulley 67 which carry belt 66.

The operation of increasing or decreasing the ground speed of the combine harvester is as follows: To increase the ground speed, control member 17 is pivoted about its axis A—A (Fig. 3) clockwise to a speed increasing position which results in a similar movement of arm 19 causing link 27 to move to the right. This actuates a valve in housing 32 to admit hydraulic fluid under pressure to tube 71. Housing 32 is connected to the supply end of pump 37 by tubing 72. The hydraulic pressure in line 71 causes the axially shiftable section of pulley 67 to move toward its axially fixed companion section, thereby causing belt 66 to move radially outward on pulley 67. This outward movement of belt 66 on pulley 67 causes the members of pulley 63 to move apart compressing spring 64. The ground speed of the harvester will now be increased and when it has been increased a desired amount, control rod 17 will be returned to a neutral position by the operator.

When it is desired to reduce the ground speed, control rod 17 is pivoted in the opposite direction to a speed decreasing position and this pivotal movement results in the opening of a valve similar to valve 53 in housing 33 which permits the hydraulic fluid in line 71 to return to tank 46 by mean of tubing 73 (Fig. 3). With the pressure relieved on the members of pulley 67, spring 64 is now operative to move the axially shiftable section of pulley 63 toward its axially fixed companion section, which results in belt 66 moving outwardly on pulley 63 and inwardly on pulley 67. This results in a reduction of ground speed of the combine. When the desired speed is reached, operating member 17 is pivoted back to a neutral position by the operator.

If desired the ground speed of the combine harvester and the height of the header can be adjusted simultaneously by the operator pivoting and axially moving control member 17 at the same time.

Now having described the invention, it is to be understood that the invention is not to be limited to the specific details herein set forth but only by the scope of the appended claims.

It is claimed and desired to secure by Letters Patent:

1. A control means for a combine including header adjusting means and propulsion means, separate control means operatively connected to said header adjusting means and to said propulsion means, a single master control member rotatably and axially movable, separate means interconnecting said master control member and said header control means and said propulsion control means, one of said interconnecting means being responsive to rotary motion of said master control member and the other of said interconnecting means being responsive to axial movement only of said master control member.

2. The combination recited in claim 1 wherein said master control element is movable axially to header raising, neutral and header lowering positions, and a counterbalancing means mounted on said harvester and operatively connected with said master control element for biasing the latter to said neutral position.

3. A control means for a combine including header adjusting means and variable speed propulsion means; separate control means operatively connected to said header adjusting means and to said variable speed propulsion means, a single master control member mounted on said harvester for back and forth movement in header raising and lowering directions and for back and forth movement in speed increasing and speed decreasing directions, separate means interconnecting said master control member and said header control means and said variable speed propulsion control means, one of said interconnecting means being responsive to back and forth movement of said master control member in header raising and lowering directions, and the other of said interconnecting means being responsive to back and forth movement of said master control member in speed increasing and decreasing directions.

References Cited in the file of this patent

UNITED STATES PATENTS

| | | |
|---|---|---|
| 1,263,750 | Dolan | Apr. 23, 1918 |
| 1,556,179 | Titman | Oct 6, 1925 |
| 2,452,153 | Ronning et al. | Oct. 26, 1948 |
| 2,528,275 | Heth | Oct. 31, 1950 |

UNITED STATES PATENT OFFICE
CERTIFICATE OF CORRECTION

Patent No. 2,842,925                             July 15, 1958

Lawrence E. Allen

It is hereby certified that error appears in the printed specification of the above numbered patent requiring correction and that the said Letters Patent should read as corrected below.

Column 6, line 6, after "motion" insert -- only --.

Signed and sealed this 21st day of October 1958.

(SEAL)
Attest:

KARL H. AXLINE
Attesting Officer

ROBERT C. WATSON
Commissioner of Patents